(12) United States Patent  
Gupta et al.

(10) Patent No.: US 7,366,635 B1  
(45) Date of Patent: Apr. 29, 2008

(54) METHODS AND APPARATUS FOR GENERATING SHAPED GRADIENTS

(75) Inventors: Niraj Gupta, Haryana (IN); Martin E. Newell, San Jose, CA (US); Peter F. Ullmann, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 362 days.

(21) Appl. No.: 11/006,342

(22) Filed: Dec. 6, 2004

(51) Int. Cl.
*G06F 11/00* (2006.01)
(52) U.S. Cl. ...................................... 702/150; 382/103
(58) Field of Classification Search ................ 702/150; 382/118, 103, 106, 107; 345/323
See application file for complete search history.

(56) References Cited

U.S. PATENT DOCUMENTS

| | | | |
|---|---|---|---|
| 5,850,463 A | 12/1998 | Horii | 382/118 |
| 6,313,840 B1 | 11/2001 | Bilodeau et al. | 345/423 |
| 6,870,954 B1 | 3/2005 | Gupta | 382/162 |

FOREIGN PATENT DOCUMENTS

EP     0 455 351 A2    11/1991

OTHER PUBLICATIONS

Adobe Systems Incorporated, Adobe Photoshop® 5.0 User Guide, pp. 207-210, ©1998 Adobe System Incorporated.
Wendy Peck, Color Power with Gradient Fills: Production Graphics with Wendy Peck at webreference.com, col. 27, http://www.webreference.com/graphics/column27/, May 27, 2000, 31 pages.
Wendy Peck, Vector Gradient Fills: Production Graphics with Wendy Peck at webreference.com, col. 28, http://www.webrefernce.com/graphics/column28/, Jun. 25, 2000, 18 pages.
Wendy Peck, Vector Gradient Fills 2: Production Graphics with Wendy Peck at webreference.com, col.29, http://www.webreference.com/graphics/column29/, Jul. 5, 2000, 24 pages.
Adobe Illustrator® 8.0 Classroom in Book, 1998, pp. 235-237, 374.
Grevera et al., "Shape-Based Interpolation of Multidimensional Grey-Level images," IEEE T. Medical Imaging, v. 15, No. 6, Dec. 1996, pp. 881-892.
Bertalmio et al., "Image Inpainting," SIGGRAPH 2000, Jul. 2000, pp. 417-424.

*Primary Examiner*—Edward Raymond
(74) *Attorney, Agent, or Firm*—Fish & Richardson P.C.

(57) ABSTRACT

Methods, systems, and apparatus, including computer program products, for calculating or applying a gradient over a region in a multi-dimensional space. A boundary defines the shape of the region. A gradient specifies a value transition between a starting position and an ending position. The following actions are performed to calculate a gradient value at any point in the selected region: determining an interpolation vector extending from an effective origin included in the starting position through the point to the ending position and defining a gradient value for the point according to the gradient and based on the position of the point along the interpolation vector relative to the effective origin and an intersection point where the interpolation vector meets the boundary.

63 Claims, 8 Drawing Sheets
(3 of 8 Drawing Sheet(s) Filed in Color)

METHODS AND APPARATUS FOR GENERATING SHAPED GRADIENTS

BACKGROUND

This invention relates to processing techniques for computing values for location-dependent attributes in a multi-dimensional space.

Conventional image processing computer applications provide a number of image processing techniques. Commercially available applications such as Photoshop® and Illustrator®, available from Adobe Systems Incorporated, of San Jose, Calif., implement gradient fill techniques for providing smooth color transitions along a vector from one color to another within a selected region or object in an image. Thus, a gradient fill can be considered a graduated blend or transition between two or more colors (or tints or shades of a color).

Known gradient fill techniques can be divided into the following categories. First, in linear or axial gradients color varies between specified boundary colors along a line between starting and ending coordinates (called the gradient axis), forming a series of isochromal lines (lines of the same color in the transition) extending infinitely (at least within the bounds of the object or region to be filled) in directions perpendicular to the gradient axis. In a radial gradient, by contrast, color varies along the radial direction extending out from the origin (typically, the object's center), forming a series of concentric circles with each point on a given circle sharing the same color in the transition. Some applications provide a variant of the radial gradient known as a diamond gradient, in which color varies radially between concentric squares or diamonds. Finally, in an angular gradient, color varies along the angular direction around the origin, with all points on a given ray extending out from the origin sharing the same color in the transition.

In general, these conventional techniques apply gradient fills within a bounding box of the object or region to be filled. They do not, however, provide a means for using the geometry of the selected region or object to guide the application of a gradient.

SUMMARY

The invention provides methods, systems, and apparatus, including computer program apparatus, for varying location-dependant attributes based at least in part on the geometry of a region or object in a multi-dimensional space.

In general, in one aspect, the invention features a computer-implemented method that includes receiving an input selecting a region in a multi-dimensional space, a boundary defining a shape of the selected region; receiving an input defining a gradient specifying a value transition to be applied between a starting position in the multi-dimensional space and an ending position in the multi-dimensional space; and applying the gradient between the starting position and the ending position by performing the following actions over the entire selected region: (i) determining an interpolation vector extending from an effective origin included in the starting position through a point in the selected region to the ending position; and (ii) defining a gradient value for the point according to the gradient and based on the position of the point along the interpolation vector relative to the effective origin and an intersection point where the interpolation vector meets the boundary.

In general, in another aspect, the invention features a computer program product with instructions operable to cause a data processing apparatus to receive an input selecting a region in a multi-dimensional space, a boundary defining a shape of the selected region; to receive an input defining a gradient specifying a value transition to be applied between a starting position in the multi-dimensional space and an ending position in the multi-dimensional space; and to apply the gradient between the starting position and the ending position over the entire selected region, including instructions to determine an interpolation vector extending from an effective origin included in the starting position through any arbitrary point in the selected region to the ending position, and to define a gradient value for the arbitrary point according to the gradient and based on the position of the point along the interpolation vector relative to the effective origin and an intersection point where the interpolation vector meets the boundary.

In general, in another aspect, the invention features a computer program product with instructions operable to cause a data processing apparatus to receive an input selecting a region in a multi-dimensional space, the region having a shape, an outline defining the shape of the selected region; to receive an input defining a gradient specifying a value transition to be applied between a starting position in the multi-dimensional space and an ending position in the multi-dimensional space; and to calculate a gradient value according to the gradient at any arbitrary point between the starting position and the ending position, including instructions to determine an interpolation vector extending from an effective origin included in the starting position through the point to the ending position and to assign a gradient value for the point according to the gradient and based on the position of the point along the interpolation vector relative to the effective origin and an intersection point where the interpolation vector meets the outline.

In general, in another aspect, the invention features a system having means for receiving an input selecting a region in a multi-dimensional space, the region having a shape, an outline defining the shape of the selected region; means for receiving an input defining a gradient specifying a value transition to be applied between a starting position in the multi-dimensional space and an ending position in the multi-dimensional space; and means for calculating a gradient value according to the gradient between the starting position and the ending position by determining interpolation vectors each extending from an effective origin included in the starting position through the region to the ending position and assigning a gradient value along each interpolation vector relative to the effective origin and an intersection point where the interpolation vector meets the outline.

The details of one or more embodiments of the invention are set forth in the accompanying drawings and the description below. Other features, aspects, and advantages of the invention will be apparent from the description and drawings, and from the claims.

DESCRIPTION OF DRAWINGS

The file of this patent contains at least one drawing executed in color. Copies of this patent with color drawing(s) will be provided by the Patent and Trademark Office upon request and payment of the necessary fee.

Like reference symbols in the various drawings indicate like elements.

DETAILED DESCRIPTION

This specification describes techniques for generating values for one or more location-dependent attributes by applying a shape gradient to a multi-dimensional space. The shape gradient can be applied to a region or an object in the multi-dimensional space and yields values that are based, at least in part, on the geometry of the region or object. Examples of attributes that can vary with location in a multi-dimensional space include color, grey-level, saturation, intensity, transparency, reflectivity, texture, rotation, size, shape, and density. The variables defining the multi-dimensional space can include spatial coordinates (e.g., x, y, and z) and/or attribute values.

Particular image-modification algorithms and drawing tools use location-dependent attributes. For example, a particle effect replicates an object in multiple sizes, shapes, colors, densities, and/or rotations that can be varied depending on the location of a particle in a two- or three-dimensional region. Likewise, a texture effect can vary attributes such as a roughness or a grain size based on the location in a region.

Non-spatial attributes can also be varied in a location-dependent fashion based on a position in a multi-dimensional attribute space. Examples of non-spatial attributes include a loudness, speed, pitch, or timbre of an audio effect or recording.

Figure 1:
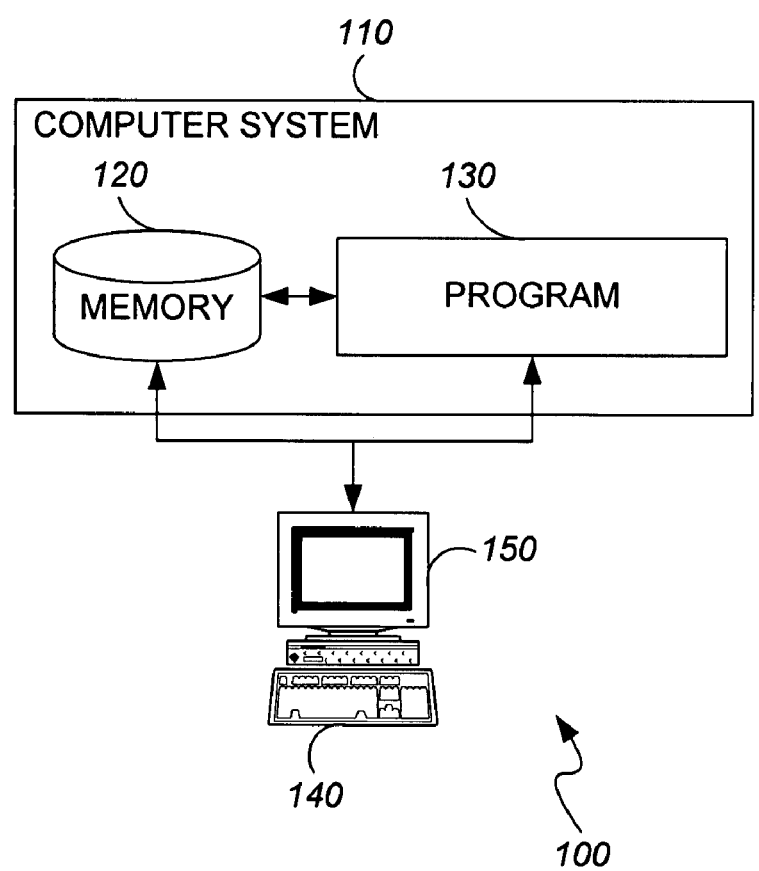
FIG. 1 is a block diagram illustrating a processing system suitable for implementing a shaped gradient operation.

FIG. 1 illustrates a processing system 100 that includes a general-purpose programmable digital computer system 110 of conventional construction, including a memory 120 and a processor for running a program 130. Processing system 100 also includes input devices 140, such as a keyboard, mouse, or digitizing pen, and output devices such as a display monitor 150. Optionally, processing system 100 also includes conventional communications hardware and software by which computer system 10 can be connected to other computer systems, such as over a network.

Figure 2:
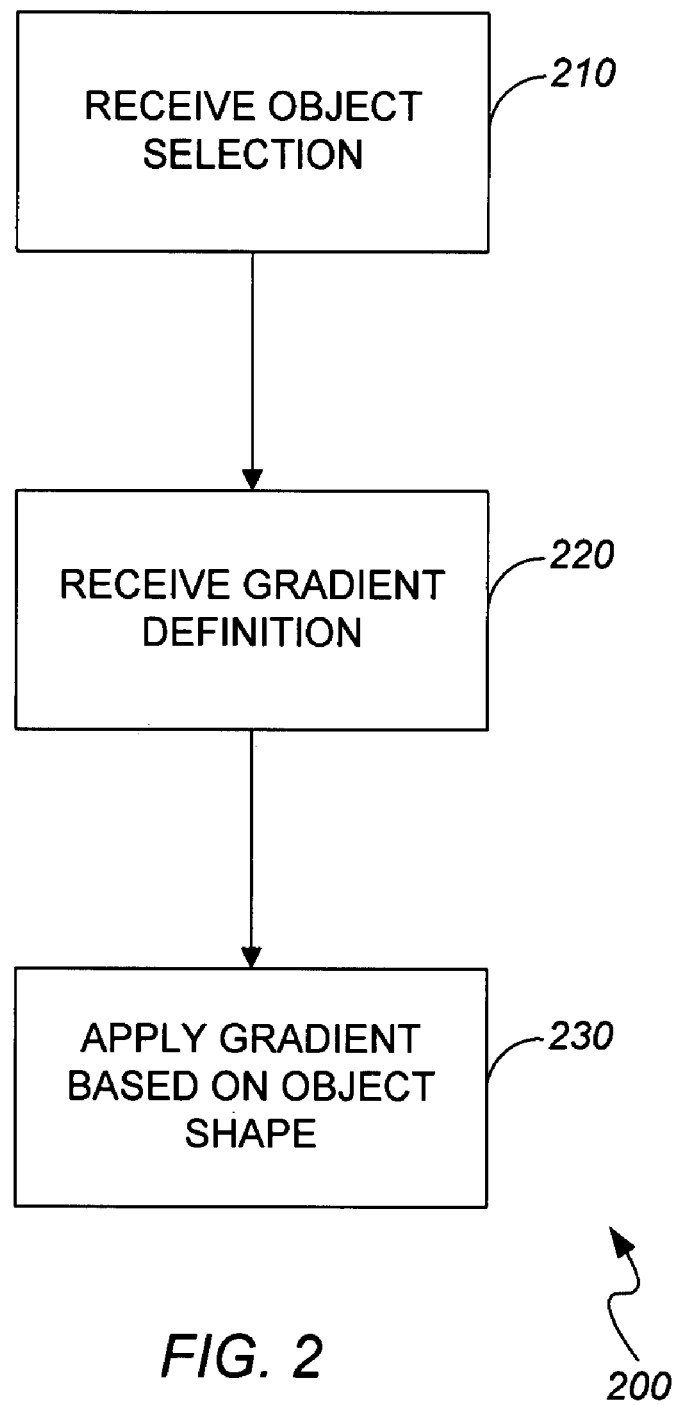
FIG. 2 is a flow diagram illustrating a general method for implementing a shaped gradient operation.

FIG. 2 illustrates a method 200 for performing a shaped gradient operation suitable for implementation in processing system 100. The method begins when system 100, which is running a program 130, receives an input selecting in a multi-dimensional space an area in which a shape gradient is to be applied (step 210)—for example, when a user employs a mouse or digitizing pen 140 to select a region or object in an image displayed on a monitor 150. The area in which the shape gradient is to be applied can be any area in the multi-dimensional space that is, or can be, demarcated by a boundary, including, e.g., graphical vector objects in images generated by vector based packages such as Adobe Illustrator®, or simply selected areas (defined, e.g., using one of various selection tools) in images generated by raster-based systems such as Adobe Photoshop®. The user selects an area by, e.g., selecting a vector object defined by one or more curves or using a selection tool to outline a desired region of a raster image, which may or may not conform to the boundaries of "objects" depicted in the raster image. In this specification, the terms "object" and "selected region" may be used interchangeably and should be understood to refer to the area in which the shape gradient is to be applied, without being limited to a particular application, type of application, or multi-dimensional space.

Figure 6:
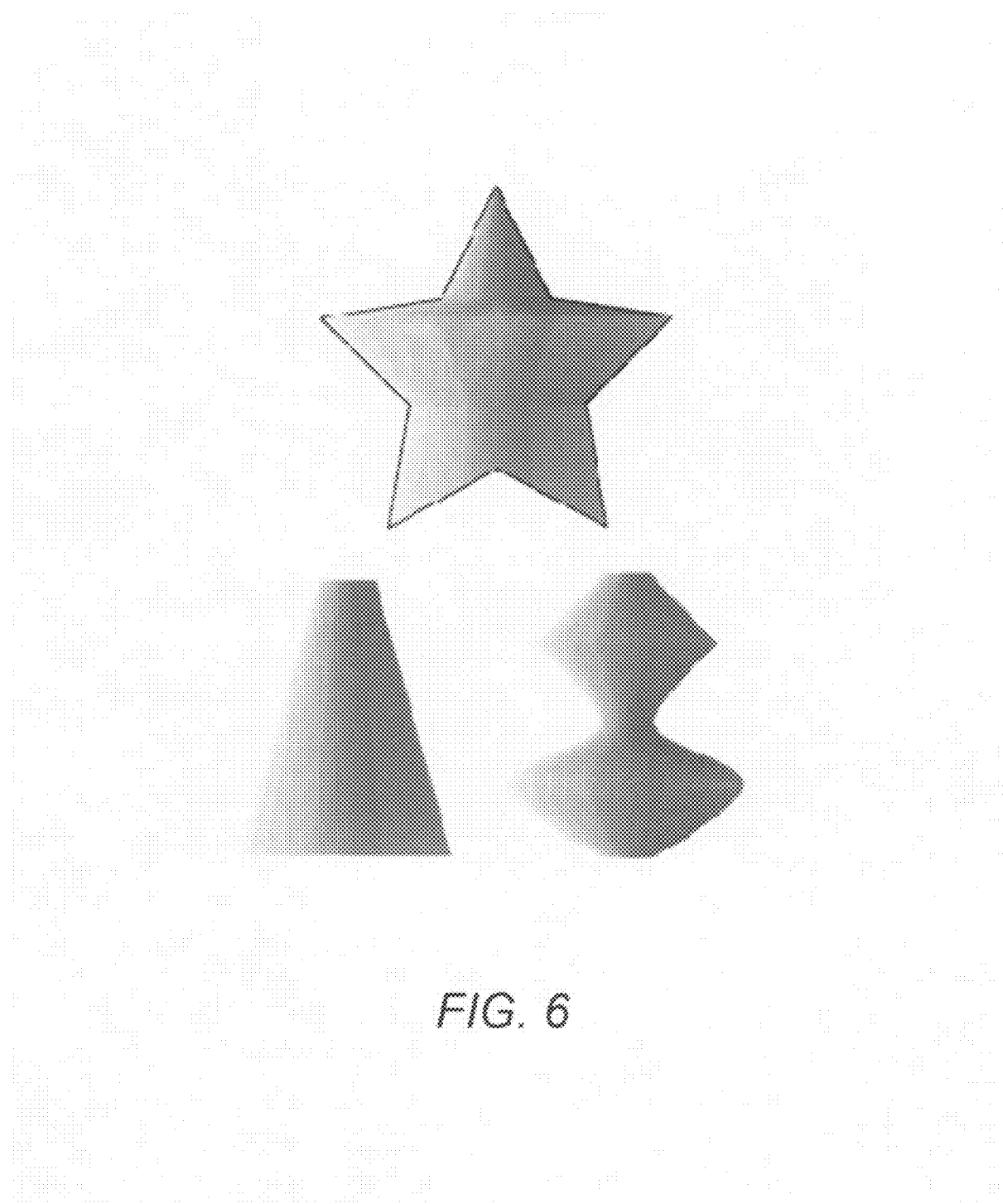
FIG. 6 depicts a number of objects filled with color using a linear shape gradient.
Figure 7:
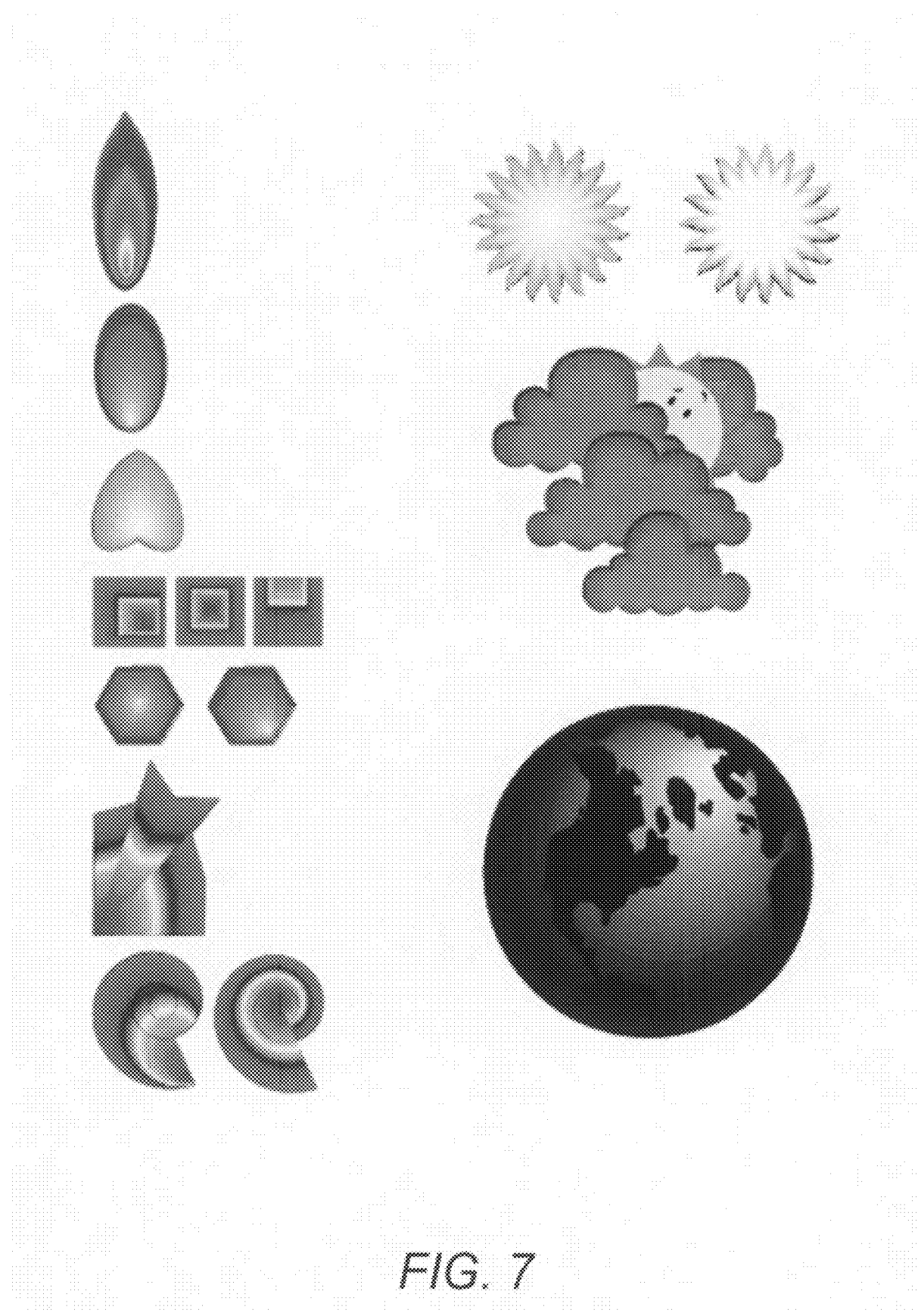
FIG. 7 illustrates a number of objects filled with color using a radial shape gradient.
Figure 8:
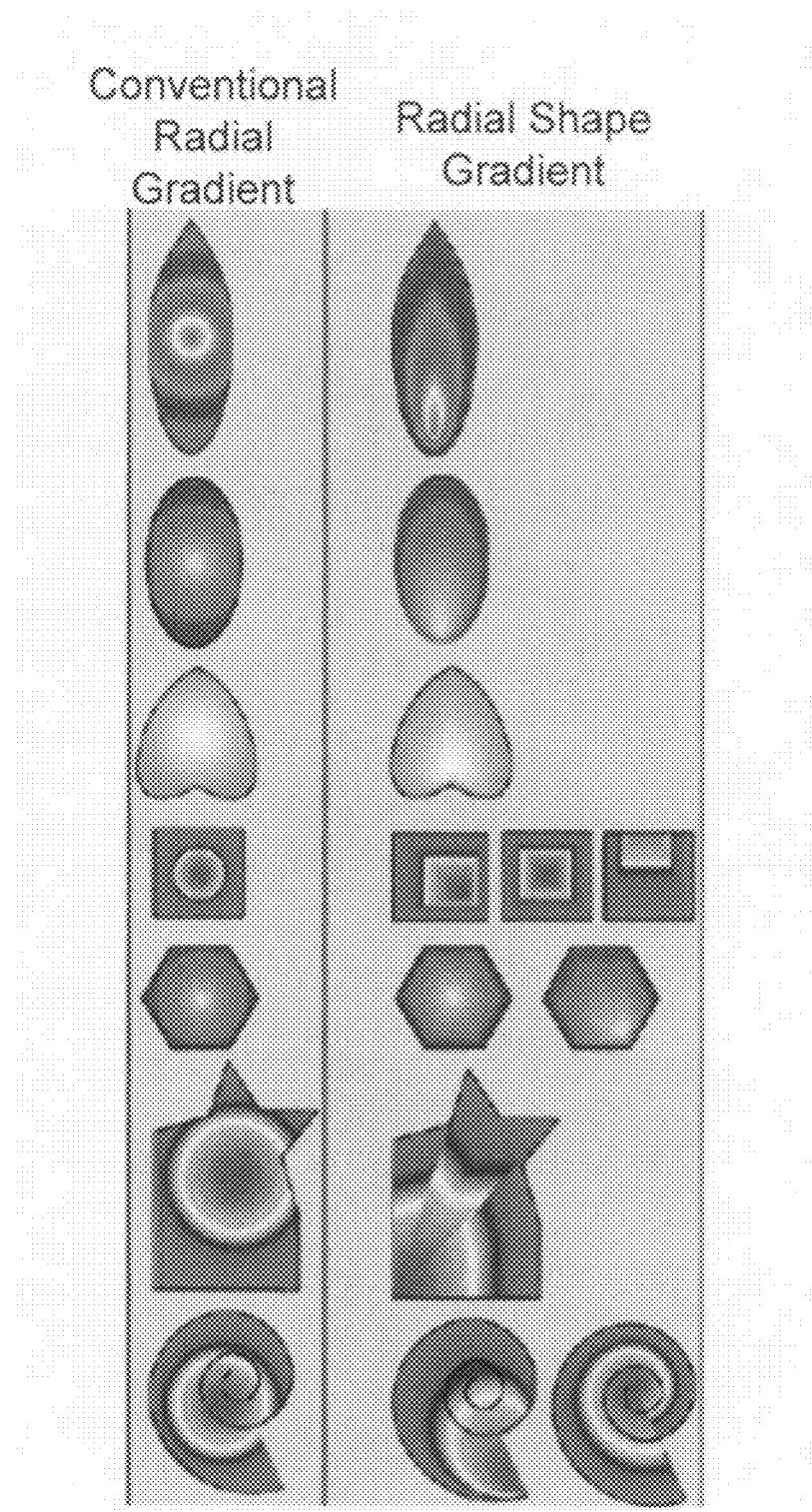
FIG. 8 illustrates a number of objects filled with color using conventional and shaped radial gradients.

As illustrated in FIGS. 3A-3D, objects 300, 305, 310 and 315 preferably have shapes defined by an object outline 320. As these figures illustrate, the object has a shape that can be any regular or irregular shape (including user-defined regular or irregular shapes), including open shapes as well as closed shapes. Several additional examples of appropriate shapes are shown in FIGS. 6, 7 and 8, which are discussed in more detail below.

System 100 receives an input defining a gradient (step 220), which generally includes information defining a graduated transition in values to be applied between starting and ending positions in the multi-dimensional space. The input can specify a gradient type, such as a radial gradient or a linear gradient. The input can also specify gradient parameters, which can include, for example, two or more gradient values between (or through) which the gradient will be applied, a starting position in the multi-dimensional space, an ending position in the multi-dimensional space, and the like. In one implementation, system 100 prompts the user to input appropriate parameters based on the specified gradient type. Alternatively, the gradient type can be specified implicitly, based on input gradient parameters.

The starting position can be one or more points in the multi-dimensional space and can encompass a single point (which can be referred to as the gradient origin) or multiple points—for example, a line that includes a portion of the object outline or that forms a second outline defining a shape. In a three-dimensional space, the starting position can be a surface (e.g., a plane). The starting position can be located inside of, outside of, on, or across the object outline. Thus, for a typical radial shape gradient, a starting position can be a point 325 located inside or outside of the object outline (or on the outline itself), from which the gradient will radiate. Alternatively, a radial gradient starting position can also encompass multiple points in the multi-dimensional space, such as a set of points, a line, a surface, or a second outline defining a shape 330. Similarly, the starting position for a linear shape gradient can be a portion 335 of the object outline, or some other line (or curve) 340, such as a line input by the user, which may or may not intersect the object outline. Typically, the ending position will correspond to some or all of the object outline, although those skilled in the art will recognize that to some extent ending positions and starting positions can be interchangeable and that therefore ending positions can also be specified as points or lines in the multi-dimensional space as described above in the context of starting positions.

Figure 3A:
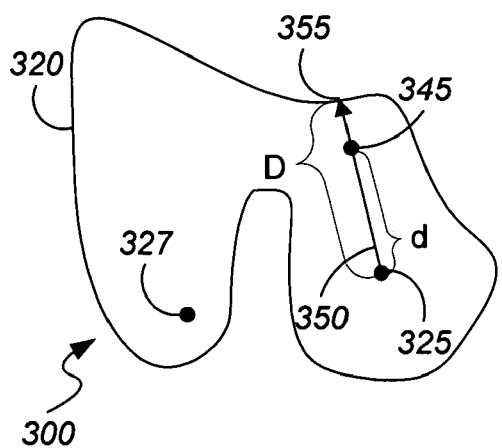
FIGS. 3A-3D illustrate the application of various shape gradients in different objects.
Figure 3B:
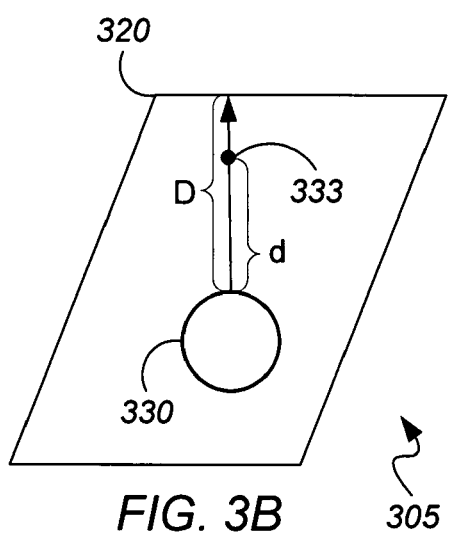
Figure 4:
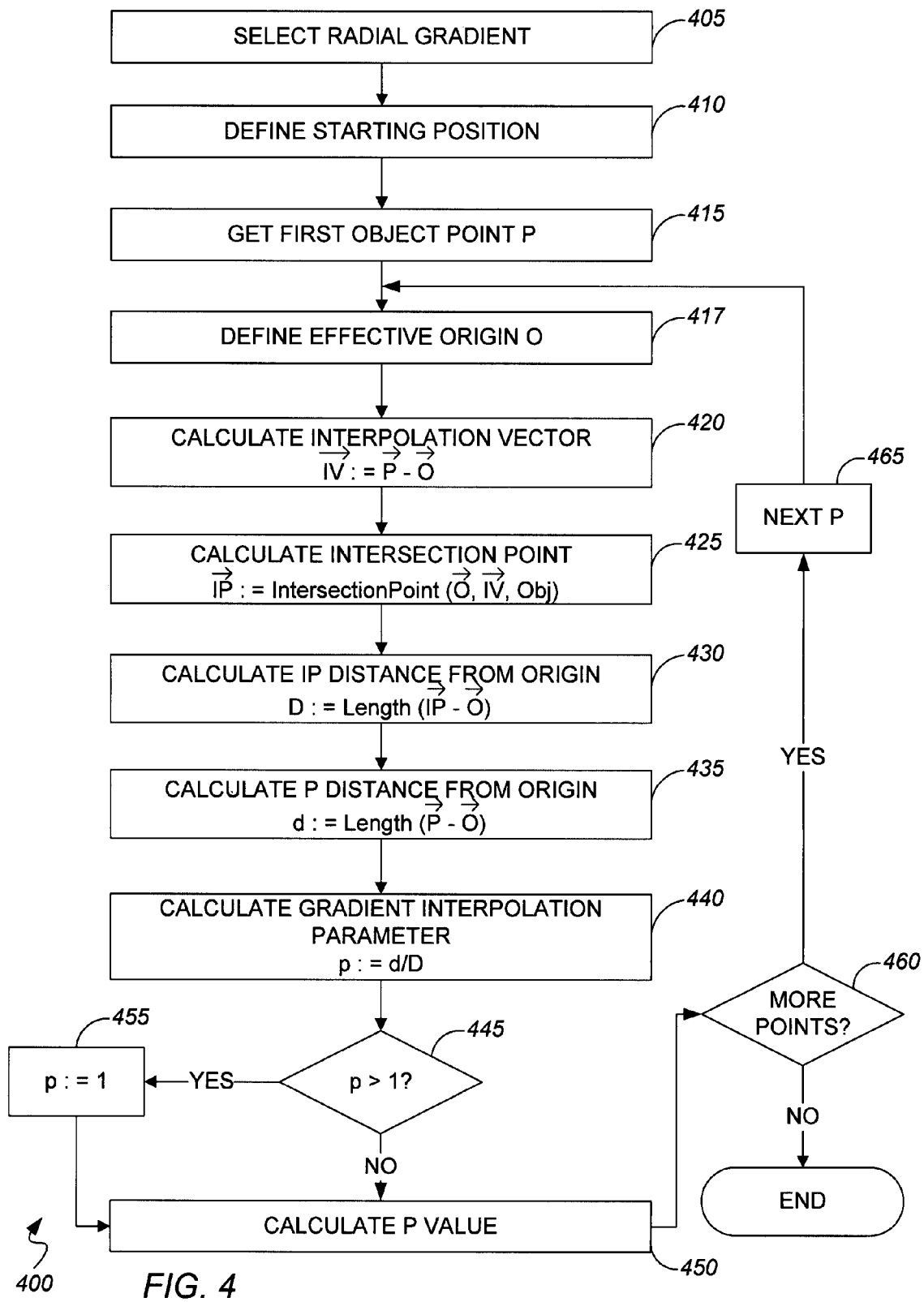
FIG. 4 is a flow diagram illustrating a method of applying a radial shape gradient.

System 100 performs a shaped gradient operation by applying the defined gradient to the selected object based at least in part on the selected object's shape (step 230). FIG. 4 illustrates in more detail one method 400 of applying a radial shape gradient as shown in FIG. 3A. The method begins when the user specifies a radial gradient and selects a starting position (steps 405 and 410, respectively). The program 130 iterates through points in the object. For each point (for example, point 345 in FIG. 3A), program 130 identifies an effective starting position (the "effective origin") (step 417). Where the starting position is a single point (e.g., a typical radial gradient), the effective origin will generally correspond to the specified starting point. Where the specified starting position includes multiple points, such as outline 330 in FIG. 3B, the effective origin is identified as a point included in the specified starting position—for example, the point on circle 330 closest to point 333 in FIG. 3B (although those of ordinary skill in the art will recognize that the effective origin can be identified using other tests based on known algorithms).

Processing system 130 calculates an interpolation vector (IV) 350 extending from the effective origin through the point to the specified ending position, which corresponds in this example to the object boundary (step 420). Program 130 identifies the point at which the interpolation vector meets the boundary as an intersection point (IP) 355 (step 425), and calculates the distance D from the effective origin to the intersection point (step 430). This value is the gradient length for point 345 (and all other points that lie on the same interpolation vector). Depending on the complexity of the object boundary and the location of the starting position, for some points, such as point 327 in object 300, the interpolation vector may have more than one intersection point with the object boundary. For such complex and/or irregular objects, program 130 can be configured to use a particular intersection point, specified, for example, as the first intersection point, the third intersection point, the closest intersection point or the farthest intersection point, in applying a shape gradient to the object. In some implementations, program 130 may prompt the user to identify which intersection point to use—for example, during input of the gradient parameters as described above.

Program 130 also calculates a second distance d representing the distance of the point 345 from the effective origin (step 435). Program 130 calculates a gradient interpolation parameter p based on the ratio d/D (step 440) and defines an attribute value for the current point 345 based on that parameter (step 450). The value can be defined for the current point using a variety of known techniques, such as interpolation. One such technique based on linear interpolation in a two-dimensional space is illustrated in the described in the pseudocode set out in Listing 1, below; other appropriate techniques will be apparent to those of ordinary skill in the art and can be selected based on the desired effect in a particular application and the dimensionality of the space.

Listing 1:

```
InterpolateGradient (p)
{
    //Consider a Gradient (G) of n attribute values C₁ ... Cₙ
    //Location of these values L₁ ... Lₙ where Lᵢ >= 0 and Lᵢ <=1,
    for all i from 1 ... n and Lᵢ <= Lᵢ₊₁
    if (p <= 0) then C := C₀
    else if ( p >= 1 ) then C := Cₙ
    else
    {
        //find the neighborhood (u) of p
        find an u such that Lᵤ <= p and Lᵤ₊₁ <= p
        if (( Lᵤ₊₁ = Lᵤ ) or ( p = Lᵤ )) then C := Cᵤ
        else
        {
            //Calculate Normalized Interpolation Parameter
            k := ( p - Lᵤ )/( Lᵤ₊₁ - Lᵤ )
```

-continued

```
            //Interpolate between attribute values Cᵤ and Cᵤ₊₁
            for parameter k
            C := Cᵤ + ( Cᵤ₊₁ - Cᵤ ) * k
        }
    }
    return C
}
```

In some implementations, if the gradient interpolation parameter for a point is greater than 1 (corresponding, for example, to a point 355 located beyond the intersection point), the gradient interpolation parameter for the point is set to 1 (step 455), such that points located beyond the intersection point are all assigned the specified ending value in the gradient. Program 130 then repeats steps 417 to 455 for a next point in the object until it has iterated through and defined values for the entire object.

Values for a location-dependent attribute can be equal to the values of a shape gradient in the multi-dimensional space or can be obtained by mapping the shape gradient value to an attribute value. For example, shape gradient values can be normalized to span the range from 0 to 1, while an attribute value can span an arbitrary range. A normalized shape gradient value can be mapped to an actual attribute value in the arbitrary range. A single shape gradient value can be mapped to values for multiple attributes.

Figure 3C:
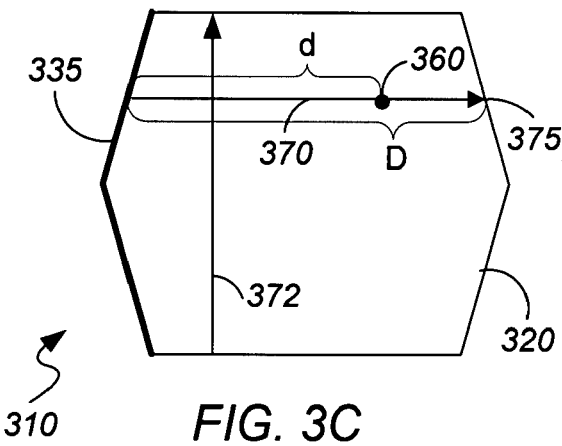
Figure 3D:
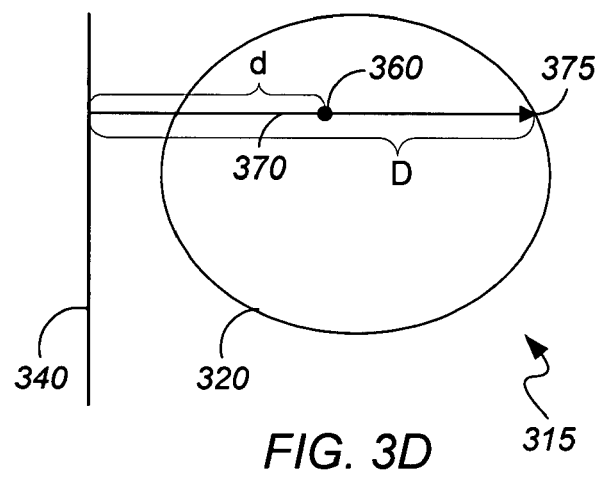
Figure 5:
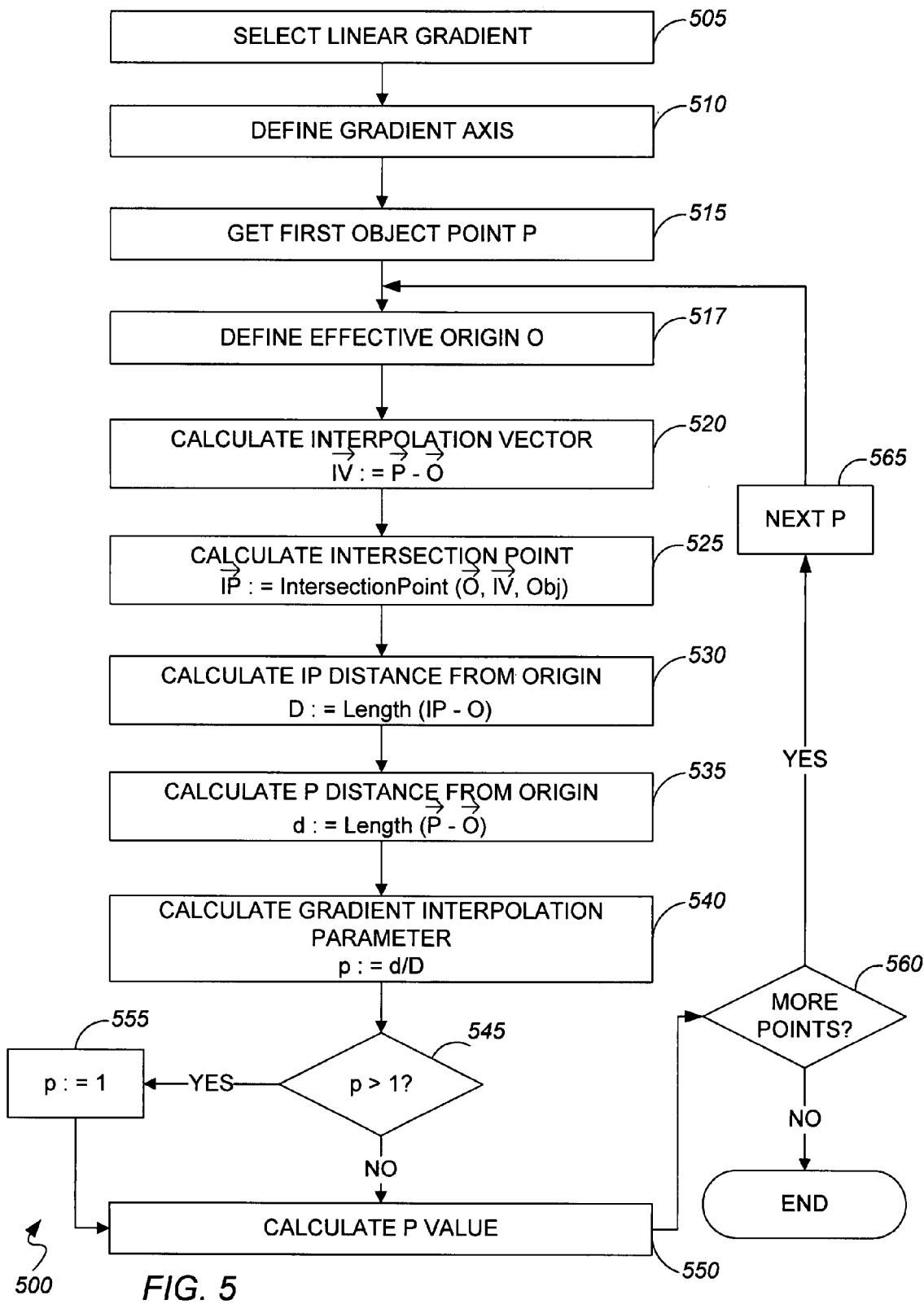
FIG. 5 is a flow diagram illustrating a method of applying a linear shape gradient.

A similar method 500 for applying a linear shape gradient, such as in the examples shown in FIGS. 3C and 3D, is illustrated in FIG. 5. The method begins when the user specifies a linear gradient (step 505). The user then selects a starting position and an ending position, which define the gradient axis for the linear gradient (step 510). For points within the object boundary (e.g., point 360), program 130 identifies an effective origin (step 517). For a typical linear shape gradient, program 130 identifies the effective origin by identifying a line running through the point and lying parallel to the gradient axis. The effective origin is the point at which this line intersects with the line or lines corresponding to the starting position (e.g., lines 335 and 340 in FIGS. 3C and 3D, respectively). Alternatively, those of ordinary skill in the art will recognize that the effective origin for a linear shape gradient can be determined using other algorithms—for example, by identifying the point on the line or lines corresponding to the starting position that is closest to the point in question.

Processing system 130 identifies an interpolation vector 370 extending from the effective origin through the point in question to the line or lines corresponding to the ending position (step 520). In general, the interpolation vector will be parallel to the gradient axis defined above. Alternatively, the interpolation vector may extend in the general direction defined by the gradient axis, but not necessarily parallel to that axis, such as in the case where the effective origin is identified by locating the closest point in the effective starting position as described above. As in the case of a radial gradient, program 130 identifies the point at which the interpolation vector meets the boundary as an intersection point (IP) 375 (step 525), and calculates the distance D from the effective origin to the intersection point (step 530). This value is the gradient length for point 360 (and all other points that lie on the same interpolation vector). As described above, program 130 can be configured to identify the intersection point for complex or irregular objects based on a predetermined set of rules or an input from the user. Program 130 calculates the distance d of the point 360 from the starting position (step 535) and calculates a gradient interpolation parameter p based on the ratio d/D (step 540), defining a shape gradient value for the current point 360 based on that parameter as described above (step 550). Program 130 then repeats steps 517 to 555 for a next point in the object until it has iterated through and defined values for the entire object.

FIGS. 6, 7, and 8 illustrate a number of two-dimensional objects processed according to the shaped gradient methods described above using color as the location-dependent attribute that is determined according to the shape gradient. The transparency or intensity of the region within the objects in FIGS. 6, 7, and 8 can vary according to the shape gradient in a similar fashion. FIG. 6 illustrates three objects filled with color using a linear shape gradient extending from the left-hand portion of the object outline to the right-hand portion. FIG. 7 illustrates a number of objects, simple and complex, filled with color using radial shape gradients extending from an origin to the object outline. Finally, FIG. 8 contrasts a number of objects filled with color using conventional radial gradients with similar objects filled using the radial shape gradients described above.

Another use for a shape gradient is in applying a particle effect. A particle effect can be applied, for example, to the object 305 in FIG. 3B using a shape gradient to vary the size, density, and shape of the particles. A value is computed for each point (e.g., point 333) in the object 305 using the shape gradient. The value at a point is then mapped to one or more location-dependent attribute values. One possible particle effect applies small, dense, circular particles along the boundary of the shape 330 and large, sparse, rectangular particles along the object outline 320. Assuming linear interpolation along the shape gradient, particles applied at point 333 are relatively large and sparse and are, for example, rectangles with rounded edges.

Shape gradients are also useful for varying non-visual location-dependent attributes. A non-visual attribute can be varied as a function of spatial variables, i.e., spatial coordinates in a multi-dimensional space. Using the object 310 in FIG. 3C as an example, attributes of a sound are varied according to the position of a cursor (not shown) in a two-dimensional image. The pitch of the sound is varied according to the position of a cursor along a horizontal interpolation vector (e.g., interpolation vector 370). The loudness of the sound is varied according to the position of a cursor along a vertical interpolation vector (e.g., interpolation vector 372). In this way, a user can adjust the pitch and loudness of the sound by moving the cursor within the object 310. Because of the shape of the object 310, the user has more precise control (per unit distance of cursor movement) over the pitch of the sound at a medium loudness than at a high or low loudness. Likewise, the user has more precise control over the loudness of the sound at medium pitches than at very high or very low pitches.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network.

Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Particular embodiments of the invention have been described. Other embodiments are within the scope of the following claims. For example, the steps recited in the claims can be performed in a different order and still achieve desirable results.

What is claimed is:

1. A computer-implemented method comprising: receiving an input selecting a region in a space, a boundary defining a shape of the selected region; receiving an input defining a gradient specifying a value transition to be applied to a plurality of location-dependent attributes between a starting position in the space and an ending position in the space; employing the gradient between the starting position and the ending position to vary the plurality of location-dependent attributes, the employing comprising determining an interpolation vector extending from an effective origin included in the starting position through a point in the selected region to the ending position; and causing the plurality of location-dependent attributes to be stored on a computer readable medium.

2. The method of claim 1, wherein:
the selected region is a vector object or a user selection.

3. The method of claim 1, wherein:
the shape of the selected region is a user-defined shape.

4. The method of claim 1, wherein:
the gradient is a linear gradient defined along a gradient axis extending from the starting position to the ending position; and
the interpolation vector is parallel to the gradient axis.

5. The method of claim 1, wherein:
the gradient is a radial gradient;
the starting position is a point; and
the interpolation vector extends radially from the starting position.

6. The method of claim 1, wherein:
the starting position is a point located inside the boundary or a point located outside the boundary.

7. The method of claim 1, wherein:
the starting position is a line that intersects the boundary or a line that does not intersect the boundary.

8. The method of claim 1, wherein:
the starting position is a start boundary defining a starting shape.

9. The method of claim 1, wherein:
the starting position is defined by a user.

10. The method of claim 1, wherein:
the ending position includes at least a portion of the boundary.

11. The method of claim 1, wherein employing the gradient to vary the plurality of location-dependent attributes between the starting position and the ending position comprises:

applying the gradient between the starting position and the ending position over the entire selected region by assigning a gradient value for the point according to the gradient and based on the position of the point along the interpolation vector relative to the effective origin and an intersection point where the interpolation vector meets the boundary.

12. The method of claim 11, wherein:
assigning the gradient value for the point includes assigning a gradient length for the interpolation vector based on a distance between the effective origin and the intersection point, assigning a gradient interpolation parameter for the point by dividing a distance between the point and the effective origin by the gradient length, and assigning the gradient value for the point based on the gradient interpolation parameter and the assigned gradient.

13. The method of claim 11, further comprising:
assigning values for the plurality of location-dependent attributes to the point in the selected region based on the gradient value at the point, wherein the plurality of location-dependent attribute include two or more of color, grey-level, saturation, intensity, transparency, reflectivity, texture, rotation, size, shape, density, roughness, grain size, loudness, speed, pitch, or timbre.

14. The method of claim 1, wherein employing the gradient to vary the plurality of location-dependent attributes between the starting position and the ending position comprises:
calculating a gradient value according to the gradient at any arbitrary point between the starting position and the ending position by defining the gradient value for the arbitrary point according to the gradient and based on the position of the arbitrary point along the interpolation vector relative to the effective origin and an intersection point where the interpolation vector meets the boundary.

15. The method of claim 14, wherein:
defining the gradient value for the point includes defining a gradient length for the interpolation vector based on a distance between the effective origin and the intersection point, defining a gradient interpolation parameter for the point by dividing a distance between the point and the effective origin by the gradient length, and defining the gradient value for the point based on the gradient interpolation parameter and the defined gradient.

16. A computer-implemented method, comprising:
receiving an input selecting a three-dimensional region in a three-dimensional space, a boundary defining a shape of the selected region;
receiving an input defining a gradient specifying a value transition to be applied to a location-dependent attribute between a starting position in the three-dimensional space and an ending position in the three-dimensional space;
employing the gradient between the starting position and the ending position to vary the location-dependent attribute applied between the starting position and the ending position, the employing comprising determining an interpolation vector extending from an effective origin included in the starting position through the arbitrary point in the selected region to the ending position; and
causing the location-dependent attribute to be stored on a computer readable medium.

17. The method of claim 16, wherein:
the three-dimensional space includes at least three spatial coordinates.

18. The method of claim 16, wherein:
the selected region is a vector object or a user selection.

19. The method of claim 16, wherein:
the shape of the selected region is a user-defined shape.

20. The method of claim 16, wherein employing the gradient to vary the value applied between the starting position and the ending position comprises:
applying the gradient between the starting position and the ending position over the entire selected region by assigning a gradient value for the point according to the gradient and based on the position of the point along the interpolation vector relative to the effective origin and an intersection point where the interpolation vector meets the boundary.

21. The method of claim 16, wherein employing the gradient to vary the value applied between the starting position and the ending position comprises:
calculating a gradient value according to the gradient at any arbitrary point between the starting position and the ending position by defining the gradient value for the arbitrary point according to the gradient and based on the position of the arbitrary point along the interpolation vector relative to the effective origin and an intersection point where the interpolation vector meets the boundary.

22. A computer program product, tangibly stored on a computer-readable medium, the product comprising instructions operable to cause a data processing apparatus to:
receive an input selecting a region in a space, a boundary defining a shape of the selected region;
receive an input defining a gradient specifying a value transition to be applied to a plurality of location-dependent attributes between a starting position in the space and an ending position in the space; and
employ the gradient between the starting position and the ending position to vary the plurality of location-dependent attributes including instructions to determine an interpolation vector extending from an effective origin included in the starting position through any arbitrary point in the selected region to the ending position; and
cause the plurality of location-dependent attributes to be stored on a computer readable medium.

23. The computer program product of claim 22, wherein:
the selected region is a vector object or a user selection.

24. The computer program product of claim 22, wherein:
the shape of the selected region is a user-defined shape.

25. The computer program product of claim 22, wherein:
the gradient is a linear gradient defined along a gradient axis extending from the starting position to the ending position; and
the interpolation vector is parallel to the gradient axis.

26. The computer program product of claim 22, wherein:
the gradient is a radial gradient;
the starting position is a point; and
the interpolation vector extends radially from the starting position.

27. The computer program product of claim 22, wherein:
the starting position is a point located inside the boundary or a point located outside the boundary.

28. The computer program product of claim 22, wherein:
the starting position is a line that intersects the boundary or a line that does not intersect the boundary.

29. The computer program product of claim 22, wherein:
the starting position is a start boundary defining a starting shape.

30. The computer program product of claim 22, wherein:
the starting position is defined by a user.

31. The computer program product of claim 22, wherein:
the ending position includes at least a portion of the boundary.

32. The computer program product of claim 22, wherein the instructions to employ the gradient to vary the plurality of location-dependent attributes between the starting position and the ending position comprise instructions to:
apply the gradient between the starting position and the ending position over the entire selected region including instructions to assign a gradient value for the point according to the gradient and based on the position of the point along the interpolation vector relative to the effective origin and an intersection point where the interpolation vector meets the boundary.

33. The computer program product of claim 32, wherein the instructions operable to assign the gradient value for the arbitrary point include instructions operable to:
assign a gradient length for the interpolation vector based on a distance between the effective origin and the intersection point;
assign a gradient interpolation parameter for the point by dividing a distance between the arbitrary point and the effective origin by the gradient length; and
assign the gradient value for the arbitrary point based on the gradient interpolation parameter and the assigned gradient.

34. The computer program product of claim 32, further comprising instructions operable to cause the data processing apparatus to:
assign values for the plurality of location-dependent attributes to the point in the selected region based on the gradient value at the point, wherein the plurality of the location-dependent attribute include two or more of color, grey-level, saturation, intensity, transparency, reflectivity, texture, rotation, size, shape, density, roughness, grain size, loudness, speed, pitch, or timbre.

35. The computer program product of claim 22, wherein the instructions to employ the gradient to vary the plurality of location-dependent attributes between the starting position and the ending position comprise instructions to:
calculate a gradient value according to the gradient at any arbitrary point between the starting position and the ending position including instructions to define the gradient value for the arbitrary point according to the gradient and based on the position of the arbitrary point along the interpolation vector relative to the effective origin and an intersection point where the interpolation vector meets the boundary.

36. The computer program product of claim 35, wherein the instructions operable to define the gradient value for the arbitrary point includes instructions to:
define a gradient length for the interpolation vector based on a distance between the effective origin and the intersection point;
define a gradient interpolation parameter for the point by dividing a distance between the arbitrary point and the effective origin by the gradient length; and
define the gradient value for the arbitrary point based on the gradient interpolation parameter and the defined gradient.

37. A computer program product, tangibly stored on a computer-readable medium, the product comprising instructions operable to cause a data processing apparatus to:
receive an input selecting a three-dimensional region in a three-dimensional space, a boundary defining a shape of the selected region;
receive an input defining a gradient specifying a value transition to be applied to a location-dependent attribute between a starting position in the three-dimensional space and an ending position in the three-dimensional space;
employ the gradient between the starting position and the ending position to vary the location-dependent attribute applied between the starting position and the ending position including instructions to determine an interpolation vector extending from an effective origin included in the starting position through the arbitrary point in the selected region to the ending position; and
cause the location-dependent attribute to be stored on a computer readable medium.

38. The computer program product of claim 37, wherein:
the three-dimensional space includes at least three spatial coordinates.

39. The computer program product of claim 37, wherein:
the selected region is a vector object or a user selection.

40. The computer program product of claim 37, wherein:
the shape of the selected region is a user-defined shape.

41. The computer program product of claim 37, wherein the instructions to employ the gradient to vary the value applied between the starting position and the ending position comprise instructions to:
apply the gradient between the starting position and the ending position over the entire selected region including instructions to assign a gradient value for the point according to the gradient and based on the position of the point along the interpolation vector relative to the effective origin and an intersection point where the interpolation vector meets the boundary.

42. The computer program product of claim 37, wherein the instructions to employ the gradient to vary the value applied between the starting position and the ending position comprise instructions to:
calculate a gradient value according to the gradient at any arbitrary point between the starting position and the ending position including instructions to define the gradient value for the arbitrary point according to the gradient and based on the position of the arbitrary point along the interpolation vector relative to the effective origin and an intersection point where the interpolation vector meets the boundary.

43. A system, comprising: means for receiving an input selecting a region in a space, the region having a shape, a boundary defining the shape of the selected region;
means for receiving an input defining a gradient specifying a value transition to be applied to a plurality of location-dependent attributes between a starting position in the space and an ending position in the space; and
means for employing the gradient between the starting position and the ending position to vary the plurality of location-dependent attributes, the means for employing including means for determining interpolation vectors each extending from an effective origin included in the starting position through the selected region to the ending position; and
means for causing the plurality of location-dependent attributes to be stored on a computer readable medium.

44. The system of claim 43, wherein:
the selected region is a vector object or a user selection.

45. The system of claim 43, wherein:
the shape of the selected region is a user-defined shape.

46. The system of claim 43, wherein:
the gradient is a linear gradient defined along a gradient axis extending from the starting position to the ending position; and
the interpolation vector is parallel to the gradient axis.

47. The system of claim 43, wherein:
the gradient is a radial gradient;
the starting position is a point; and
the interpolation vector extends radially from the starting position.

48. The system of claim 43, wherein:
the starting position is a point located inside the boundary or a point located outside the boundary.

49. The system of claim 43, wherein:
the starting position is a line that intersects the boundary or a line that does not intersect the boundary.

50. The system of claim 43, wherein:
the starting position is a start boundary defining a starting shape.

51. The system of claim 43, wherein:
the starting position is defined by a user.

52. The system of claim 43, wherein:
the ending position includes at least a portion of the boundary.

53. The system of claim 52, wherein the means for assigning the gradient value for the arbitrary point further comprises:
means for assigning a gradient length for the interpolation vector based on a distance between the effective origin and the intersection point;
means for assigning a gradient interpolation parameter for the point by dividing a distance between the arbitrary point and the effective origin by the gradient length; and
means for assigning the gradient value for the arbitrary point based on the gradient interpolation parameter and the assigned gradient.

54. The system of claim 52, further comprising:
means for assigning a value for the plurality of location-dependent attributes to a point in the selected region based on the gradient value at the point, wherein the location-dependent attribute includes two or more of color, grey-level, saturation, intensity, transparency, reflectivity, texture, rotation, size, shape, density, roughness, grain size, loudness, speed, pitch, or timbre.

55. The system of claim 43, the means for employing the gradient to vary the plurality of location-dependent attributes between the starting position and the ending position further comprising:
means for applying the gradient between the starting position and the ending position over the entire selected region including means for assigning a gradient value for the point according to the gradient and based on the position of the point along the interpolation vector relative to the effective origin and an intersection point where the interpolation vector meets the boundary.

56. The system of claim 43, the means for employing the gradient to vary the plurality of location-dependent attributes between the starting position and the ending position further comprising:
means for calculating a gradient value according to the gradient at any arbitrary point between the starting position and the ending position including means for defining the gradient value for the arbitrary point according to the gradient and based on the position of the arbitrary point along the interpolation vector relative to the effective origin and an intersection point where the interpolation vector meets the boundary.

57. The system of claim 56, further comprising:

means for defining a gradient length for the interpolation vector based on a distance between the effective origin and the intersection point;

means for defining a gradient interpolation parameter for the point by dividing a distance between the point and the effective origin by the gradient length; and means for defining the gradient value for the point based on the gradient interpolation parameter and the defined gradient.

58. The system of claim 56, wherein:

the three-dimensional space includes at least three spatial coordinates.

59. The system of claim 56, wherein:

the selected region is a vector object or a user selection.

60. The system of claim 56, wherein:

the shape of the selected region is a user-defined shape.

61. The system of claim 56, wherein the means for employing the gradient to vary the value applied between the starting position and the ending position further comprise:

means for applying the gradient between the starting position and the ending position over the entire selected region including means for assigning a gradient value for the point according to the gradient and based on the position of the point along the interpolation vector relative to the effective origin and an intersection point where the interpolation vector meets the boundary.

62. The system of claim 56, wherein the means for employing the gradient to vary the value applied between the starting position and the ending position further comprise:

means for calculating a gradient value according to the gradient at any arbitrary point between the starting position and the ending position including means for defining the gradient value for the arbitrary point according to the gradient and based on the position of the arbitrary point along the interpolation vector relative to the effective origin and an intersection point where the interpolation vector meets the boundary.

63. A system, comprising: means for receiving an input selecting a three-dimensional region in a three-dimensional space, a boundary defining a shape of the selected region; means for receiving an input defining a gradient specifying a value transition to be applied between a starting position in the three-dimensional space and an ending position in the three-dimensional space; means for employing the gradient between the starting position and the ending position to vary the location-dependent attribute applied between the starting position and the ending position, the means for employing including means for determining an interpolation vector extending from an effective origin included in the starting position through the arbitrary point in the selected region to the ending position; and means for causing the location-dependent attribute to be stored on a computer readable medium.

* * * * *

UNITED STATES PATENT AND TRADEMARK OFFICE
CERTIFICATE OF CORRECTION

PATENT NO.       : 7,366,635 B1                                    Page 1 of 1
APPLICATION NO.  : 11/006342
DATED            : April 29, 2008
INVENTOR(S)      : Gupta et al.

It is certified that error appears in the above-identified patent and that said Letters Patent is hereby corrected as shown below:

On the title page,

[*] Notice:    Subject to any disclaimer, the term of this patent is extended or adjusted under 35 USC 154(b) by 362 days Delete the phrase "by 362 days" and insert -- by 433 days --

Signed and Sealed this

Twenty-seventh Day of January, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,366,635 B1 Page 1 of 1
APPLICATION NO. : 11/006342
DATED : April 29, 2008
INVENTOR(S) : Gupta et al.

It is certified that error appears in the above-identified patent and that said Letters Patent is hereby corrected as shown below:

On the Title Page

Item [*] Notice: Subject to any disclaimer, the term of this patent is extended or adjusted under 35 USC 154(b) by 362 days Delete the phrase "by 362 days" and insert --by 433 days--

On the Title Page

Item (56) OTHER PUBLICATIONS
right-hand column, line 5:
delete "webrefernce", and replace with --webreference--

Item (56) OTHER PUBLICATIONS
right-hand column, line 10:
delete "Classroom in Book", and replace with --Classroom in a Book--

Signed and Sealed this

Seventeenth Day of February, 2009

JOHN DOLL
*Acting Director of the United States Patent and Trademark Office*